United States Patent [19]

Suzuki et al.

[11] Patent Number: 4,824,569

[45] Date of Patent: Apr. 25, 1989

[54] HOLLOW FIBER FOR DIALYSIS AND METHOD FOR MANUFACTURE THEREOF

[75] Inventors: Kazuhiko Suzuki, Fujinomiya; Kazuaki Takahara, Tokyo, both of Japan

[73] Assignee: Terumo Kabushiki Kaisha Trading as Terumo Corporation, Tokyo, Japan

[21] Appl. No.: 53,536

[22] Filed: May 26, 1987

Related U.S. Application Data

[63] Continuation of Ser. No. 769,886, Aug. 27, 1985, abandoned.

[30] Foreign Application Priority Data

Aug. 27, 1984 [JP]  Japan ............................. 59-178030

[51] Int. Cl.$^4$ ............................................. B01D 13/00
[52] U.S. Cl. ........................... 210/500.23; 210/500.29; 264/199
[58] Field of Search .................... 55/16, 158; 264/199, 264/41; 210/500.23, 500.29

[56] References Cited

U.S. PATENT DOCUMENTS

| | | | |
|---|---|---|---|
| 3,888,771 | 6/1975 | Isuge et al. | 264/199 X |
| 4,332,752 | 6/1982 | Henne et al. | 264/41 |
| 4,444,716 | 4/1984 | Adyagi et al. | 264/199 X |
| 4,535,028 | 8/1985 | Yokogi et al. | 55/158 X |
| 4,604,326 | 8/1986 | Manabe et al. | 210/500.23 X |
| 4,609,464 | 9/1986 | Adyagi et al. | 210/500.1 X |

OTHER PUBLICATIONS

Japan Patent Abstracts: JP-A-61-146306, 11/86.
Japan Patent Abstracts: JP-A-60-166008, 1/86.
Japan Patent Abstracts: JP-A-60-166007, 1/86.
Japan Patent Abstracts: JP-A-59-225708, 4/85.
European Search Report on EP 85 11 0773.

Primary Examiner—Frank Spear
Attorney, Agent, or Firm—Cushman, Darby & Cushman

[57] ABSTRACT

Unstretched hollow fibers of cuprammonium cellulose for dialysis possessing a film structure having a porosity of 15 to 25%, a pore diameter of 25 to 40 Å, and an ultrafiltration ratio of 3.0 to 5.5 ml/mmHg.hr.m$^2$ are obtained by extruding, coagulating, and regenerating a cuprammonium cellulose spinning dope having a cellulose concentration of 6.8 to 8.7% and a viscosity of 500 to 1,300 poises (at 20° C.).

11 Claims, 5 Drawing Sheets

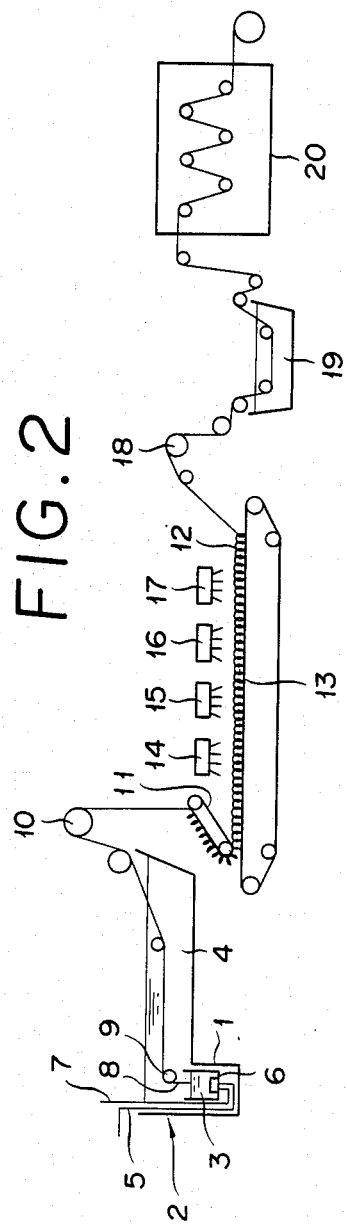
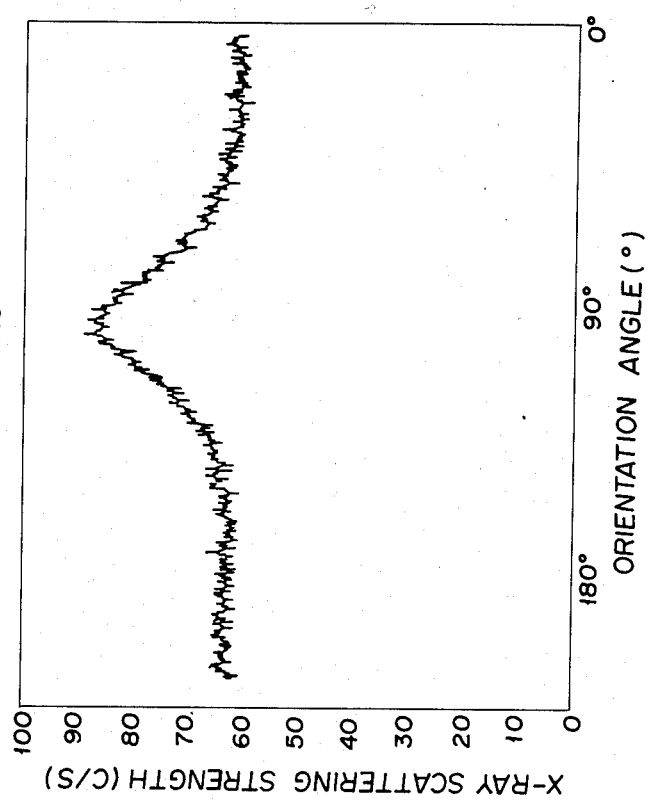
FIG. 2
FIG. 10

HOLLOW FIBER FOR DIALYSIS AND METHOD FOR MANUFACTURE THEREOF

This is a continuation of application Ser. No. 769,886, filed Aug. 27, 1985, which was abandoned upon the filing hereof.

BACKGROUND OF THE INVENTION

1. Field of the Invention

This invention relates to hollow fibers for dialysis and to a method for the manufacture thereof. More particularly, this invention relates to hollow fibers for use as a dialysis membrane of an artificial kidney device and to a method for the manufacture thereof. Description of Prior Art:

Recently, use of hollow fibers in a diaphragm for dialysis has come to prevail. Particularly in artificial kidney devices, use of extremely thin hollow fibers for dialysis is gaining in popularity. As concerns hollow fibers for dialysis, various inventions pertaining to materials for forming hollow fibers have been published (e.g., Japanese Patent Publication SHO No. 39(1964)-28,625, USP 3,888,771 (SHO No. 50(1975)-40,168), and SHO No. 55(1980)-1,363, and Japanese Patent Laid-open SHO No. 49(1974)-134,920). These hollow fibers are mostly manufactured by extruding a spinning dope of cuprammonium cellulose into a gaseous atmosphere, allowing extruded tubes of the spinning dope to fall by the force of gravity acting thereon, and thereafter immersing them in a coagulating bath thereby coagulating and regenerating the tubes of the spinning dope. While the tubes are falling down the gaseous atmosphere, the ammonia in the dope is volatilized and released through the surface of the tubes into the atmosphere and, therefore, the tubes begin to solidify inwardly from the surface. The hollow fibers consequently produced invariably form skin layers on their external surface, though to varying degrees depending on the types of method of manufacture. None of the hollow fiber, therefore, has uniform texture throughout the entire wall thickens of their tubes. Hollow Fibers of certain types have been observed to have voids formed in the walls of their tubes. When hollow fibers possessing such skin layers or hollow fibers containing voids in their walls are used for dialysis, especially for dialysis in artificial kidney devices, they are liable to cause thrombosis, impair blood cells and other beneficial components because of the voids, and effect only insufficient separation of components of intermediate molecular weights. Thus, they are not fully effective in dialyzing the fluid under treatment. Further, the conventional hollow fibers are not fully satisfactory in terms of mechanical strength. Any effort to improve hollow fibers in efficiency of dialysis entails the necessity for decreasing their wall thickness at an inevitable sacrifice of mechanical strength. It is well known that the ease of handling of the spinning dope at every step of spinning increases in proportion as the viscosity of the spinning dope decreases. If the viscosity of the spinning dope is excessively lowered, however, the concentration of cellulose in the dope is lowered with the possible result that the hollow fibers consequently produced will suffer from insufficient strength and occurrence of pinholes. The conventional hollow fibers do not tolerate a decrease in the viscosity of the spinning dope.

An object of this invention, therefore, is to provide novel hollow fibers for dialysis and a method for the manufacture thereof.

Another object of this invention is to provide hollow fibers for dialysis so excellent in the effect of dialysis as to warrant utility in artificial kidney devices and a method for the manufacture of the hollow fibers.

SUMMARY OF THE INVENTION

The objects described above are accomplished by unstretched hollow fibers, obtained by extruding, coagulating, and regenerating a cuprammonium cellulose spinning dope having a cellulose concentration of 6.0 to 8.7% and a viscosity of 500 to 1,300 poises (at 20° C.) and possess of a film structure having a porosity of 15 to 25%, a pore diameter of 25 to 40 Å, and an ultrafiltration ratio of 3.0 to 5.5 ml/mmHg.hr.m$^2$. The objects are further accomplished by causing the hollow fibers of this invention to be extruded by the floating spinning process and further allowing the film structure of the hollow fibers to aquire a substantially skinless outer surface and a substantially voidless inner surface, and enabling the wall thickness of the hollow fibers in the cross section thereon perpendicular to the axial line of the hollow fibers to be varied in the axial direction of the hollow fibers so that the overall boundary film thickness in the axial direction of the hollow fibers will not exceed 40 μm during the dialysis.

The objects are also accomplished by a method for the manufacture of unstretched cuprammonium cellulose hollow fibers of a film structure having porosity of 15 to 25%, a pore diameter of 25 to 40 Å, and an ultrafiltration ratio of 3,0 to 5.5 ml/mmHg.hr.m$^2$, which method is characterized by directly discharging a cuprammonium cellulose spinning dope possessing a cellulose concentration of 6.0 to 8.7% and a viscosity of 500 to 1,300 poises (at 20° C.) through annular spinning orifices into a non-coagulating solution in a bath filling with a coagulating solution in the upper layer and the non-coagulating solution in the lower layer and, at the same time, allowing the non-coagulating solution to enter and fill up the interiors of the discharged tubes of the spinning dope, then passing the tubes of the spinning dope through the coagulating solution thereby allowing the tubes to coagulate, allowing the resultant wet hollow fibers to be shaken down onto a conveyor device without being stretched, subjecting the hollow fibers to coagulation, regeneration, and washing with water while in motion as carried on the conveyor device, then subjecting the regenerated hollow fibers to plasticization, and further at least shrinking and drying the resultant hollow fibers. Further, the objects are accomplished by a method for the manufacture of unstretched hollow fibers for dialysis, wherein the spinning dope discharged through the annular spinning orifices and the non-coagulating solution entering to fill up the interiors of the extruded tubes of the spinning dope have a linear speed ratio in the range of 1.2 to 3.0.

BRIEF DESCRIPTION OF THE DRAWINGS

FIG. 2 is a typical apparatus for working a method for the production of hollow fibers of this invention, FIG. 10 is a graph showing an X-ray scattering strength curve of the hollow fiber stretched by 30% prior to entry in the drier.

DESCRIPTION OF PREFERRED EMBODIMENT

Figure 1:
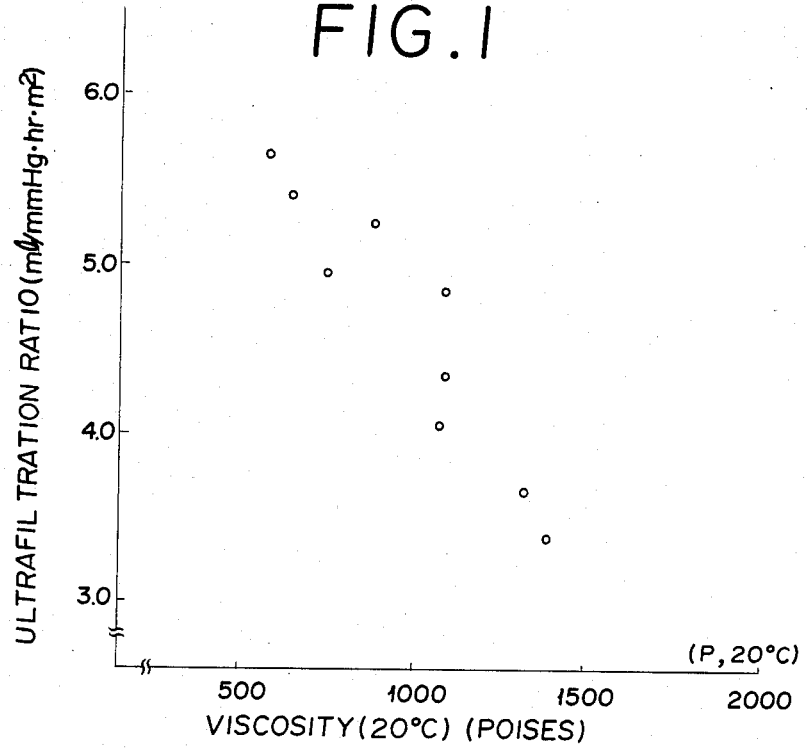
FIG. 1 is a graph showing the relation between the viscosity and the ultrafiltration ratio of the spinning dope usable for the present invention.

The unstretched hollow fibers of the present invention are hollow fibers of cuprammonium cellulose possessing a film structure having a porosity of 15 to 25%, preferably 15 to 22%, a pore diameter of 25 to 40 Å, preferably 31 to 38 Å, an an ultrafiltration ratio of 3.0 to 5.5 ml/mmHg.hr.m$^2$, preferably 3.2 to 5.2 ml/mmHg.hr.m$^2$. They are produced by coagulating and regenerating a cuprammonium cellulose spinning dope having a cellulose concentration of 6.0 to 8.7% and a viscosity of 500 to 1,300 poises. As means of spinning the spinning dope of this invention, although adoption of the aerial dropping spinning method is conceivable, the spinning contemplated by this invention is desired to be effected by the floating spinning method. As disclosed by one of the inventors in the specification of U.S. Pat. No. 4,444,716, the floating spinning method specifically comprises directly discharging the cuprammonium cellulose spinning dope of the foregoing description through annular spinning orifices into a non-coagulating solution in a bath filled with a coagulating solution in the upper layer and the aforementioned non-coagulating solution in the lower layer and, at the same time, allowing the non-coagulating solution to enter and fill up the interiors of the discharged tubes of the spinning dope, and subsequently passing the tubes through the coagulating solution. In this case, the spinning dope discharged through the spinning orifices and the non-coagulating solution allowed to enter and fill up the interiors of the tubes of the spinning dope have a linear speed ratio of 1.2 to 3.0. The wet hollow fibers obtained as described above are shaken down, without being stretched, onto a conveyor device, subjected, while in motion as carried on the conveyor device, to coagulation, regeneration, and washing with water, then subjected to plasticization, and further taken up on bobbins after shrinking and drying, to give rise unstretched hollow fibers for dialysis aimed at by the present invention. The term "unstretched" as used in the present invention means that the stretching step which is carried out for the purpose of changing the crystalline structure of cellulose molecules of fibers and increasing the fibrous strength has not been undergone. The stretching is avoided because it degrades the fibers ability of dialysis. Incidentally, the hollow fibers of the present invention for dialysis have ample strength in their unstretched form. The hollow fibers obtained as described above acquire a film structure having a substantially skinless outer surface and a substantially voidless inner surface. The expression "substantially skinless" means that the skin layer has only a small thickness of not more than 300 Å and the expression "substantially voidless" means that voids larger than 200 Å are absent. These conditions can be clearly confirmed through observation of a given hollow fiber under an electron microscope at 20,000 magnifications.

Although the hollow fibers aimed at by the present invention may be attained by the aerial dropping method, they are preferably obtained by extruding the spinning dope by the floating spinning method, causing the extruded tubes of the spinning dope to be coagulated and regenerated, without being stretched, on the conveyor device. Owing to this peculiar procedure of production, therefore, the hollow fibers can be obtained in a film structure having the wall thickness varied in the axial direction of the hollow fibers. The fact that the hollow fibers are in an unstretched form is considered to have some bearing upon this peculiar film structure. The hollow fibers possessing this film structure cause turbulence near the walls thereof during the course of dialysis and permit a reduction in the thickness of the boundary film which is one cause for the degradation of the ability of dialysis. The hollow fibers of the present invention are enabled to acquire a film structure having an overall boundary film thickness of not more than 40 μm, preferably of not more than 3.8 μm, during the course of dialysis.

The term "boundary film" as used herein means an imaginary film considered to be generated on the surface of film by stagnation of the blood or the dialytic solution during the course of dialysis. It forms a cause for the degradation of the ability of dialysis. The expression "overall boundary film thickness" as used herein means the combined thickness of the two boundary films formed one on the blood side and the other on the dialytic solution side.

The haloganated hydrocarbon to be used as the non-coagulating solution in the method of this invention for the manufacture of the hollow fibers has a specific gravity of not less than 1.3, preferably of 1.4 to 1.7 and solubility of not more than 0.15 g/100 ml, preferably not more than 0.05 g/100 ml, in water. Typical examples of the halogenated hydrocarbon include carbon tetrachlodie, 1,1,1-trichloroethane, 1,1,2-trichloroethane, trichloroethylene, tetrachloroethane, tetrachloroethylene, and trichlorotrifluoroethane. Typical examples of the non-coagulating solution suitably used for filling the interiors of the extruded tubes of the spinning dope include isopropyl myristate, liquid paraffin, n-octane, n-decane, and light oil. The coagulating solution for the spinning dope is an aqueous alkali solution. Examples of the aqueous alkali solution are aqueous solutions of sodium hydroxide, potassium hydroxide, lithium hydroxide, and ammonium hydroxide. Among other aqueous alkali solutions cited above, aqueous sodium hydroxide solution is a preferred selection. The alkali concentration of this aqueous alkali solution is in the range of 30 to 150 g/liter, preferably 40 to 140 g/liter.

If the cellulose concentration of the spinning dope is not more than 6.0%, the hollow fibers contain numerous pinholes and acquire insufficient mechanical strength and, therefore, fail to fulfil their function. If the cellulose concentration exceeds 8.7%, the hollow fibers, in spite of improvement in strength, suffer from heightened viscosity and decreased ease of handling and, moreover, the extruded tubes of the spinning dope are pulsated so heavily as to sustain breakage and render continued extrusion of the spinning dope difficult, with the result that the produced hollow fibers acquire desired pore diameter, porosity, and ability of dialysis with difficulty.

The relation between the viscosity and the ultrafiltration ratio of the spinning dope is shown in Fig. 1. It is noted from this graph that the ultrafiltration ratio of the spinning dope can be heightened by lowering the viscosity of the spinning dope. From the results given above, it is concluded that the spinning dope optimally suits the manufacture of hollow fibers when the cellulose concentration of the spinning dope is in the range of 6.0 to 8.7%, preferably 7.0 to 8.5% and the viscosity of the spinning dope is in the range of 500 to 1,300 poises, preferably 800 to 1200 poises (at 20° C.).

Now, the present invention will be described more specifically below with reference to working examples.

EXAMPLE I

An aqueous cuprammonium solution was prepared by suspending 540 g of basic copper sulfate in 2,354 g of an aqueous 25% ammonia and 1,690 g of an queous 10% sodium sulfite solution was added thereto. In the resultant mixed solution, 2,045 g of water-containing linter (having a water content of 69.7%) obtained by wet pulverizing cotton linter pulp having a polymerization degree of about 1,000 (±100) and dehydrating the wet pulverized cotton linter pulp and 210 g of concentration-adjusting RO water were dissolved by stirring and then 1,233 g of an aqueous 10% sodium hydroxide solution was added thereto to produce an aqueous cuprammonium cellulose solution (specific gravity 1.08). This aqueous solution was used as a spinning dope. The cellulose concentration of this spinning dope was 7.8% and the viscosity thereof was 1,100 poises (at 20° C.). In an apparatus constructed as illustrated in FIG. 2, 1,1,1-trichloroethane was supplied as a non-coagulating solution 3 to a bath 2 to form a lower layer and then an aqueous solution containing 50 g of sodium hydroxide per liter was supplied as a coagulating solution thereto to form an upper layer 4. The spinning dope was led through a spinning dope inlet tube 5 to a spinneret 6 having annular spinning orifices disposed upwardly therein and directly discharged, under nitrogen pressure of 5 kg/cm$^2$, though the spinning orifices into the non-coagulating solution 3 of the lower layer kept at 20°±2° C. The spinning orifices had an orifice diameter of 3.8 mm and the spinning dope was discharged at a rate of 5.86 ml/min. In the meantime, isopropyl myristate (specific gravity 0.854) was introduced through a non-coagulating inlet tube 7 attached to the spinneret 6 and discharged as enclosed in the linearly discharged spinning dope. The inlet tube had a tube diameter of 1.2 mm and the isopropyl myristate was discharged at a rate of 1.50 ml/mim. The linear speed ratio of the spinning dope to the non-coagulating solution was 1.79. Then, the discharged spinning dope (with the non-coagulating solution enclosed) 8 (specific gravity 1.026) was allowed to ascend into trichlorotrifluoroethane and further into the aqueous sodium hydroxide solution in the upper layer (20°±2° C.) and passed around a direction-changing bar 9 so as to be forwarded in the horizontal direction afterward. In this case, the height of the non-coagulating solution was 200 mm, the distance from the interface to the upper end of the direction-changing bar 9 was 15 mm, the spinning speed was 60 m/min., and the distance of travel was 4.4 m. The tubes of the spinning dope were pulled out of the bath by a roller 10, shaken down on a first conveyor device 11 to form heaps of loops, then reversed on a second conveyor device 13, amply coagulated with a shower of an aqueous 12% sodium hydroxide solution 14 on the second conveyor device 13, subjected to a water-washing treatment 15, given a regeneration treatment (for removal of copper) 16 with 5% sulfuric acid, and subjected again to a water-washing treatment 17. Then, hollow fibers 12 were lifted from the conveyor device 13 by a roller 18 and forwarded through a plasticizing bath 19. Glycerol solution was used as the plasticizing solution. Then, the hollow fiber were guided through a drier 20 having a plurality of rollers disposed in a zigzagging pattern such that the diameters of the hollow fibers would gradually decrease in the direction of travel. The hollow fibers so dried were then taken up on a bobbin.

Figure 3:
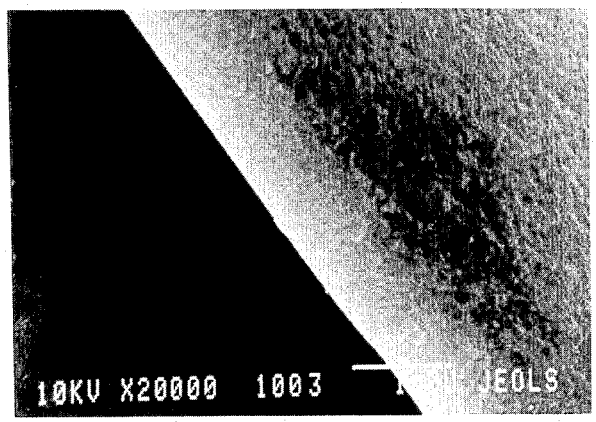
FIG. 3 is an electron microscopic photograph (20,000 magnifications) showing a longitudinally crosssectional texture of a hollow fiber of the present invention.
Figure 4:
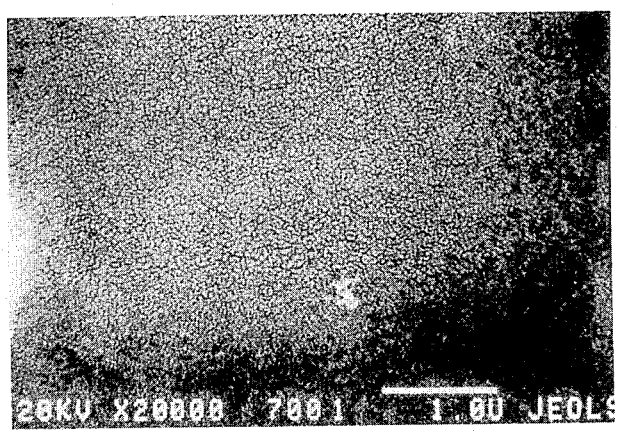
FIG. 4 is an electron microscopic photograph (20,000 magnifications) showing an inner surface texture of the hollow fiber of the present invention.

In the drying step, the diameters of the rollers were varied in due consideration of a possible effect on tension of the shrinkage of hollow fibers would be taken up at a speed incapable of exerting any tension other than the tension necessary for the travel of the hollow fibers. In this matter, the unstretched fibers could be obtained in a film structure suffering minimally from any change due to tension. The attributes of the hollow fibers so produced are shown in Table 3. The outer surface texture and the inner surface texture in the longitudinal cross section of the hollow fiber obtained as described above are shown in FIGS. 3 and 4. The outer surface was substantially skinless and the inner surfaces substantially voidless. The cross-sentional texture was photographed with an electron microscope (product of Nippon Denshi Kogyo K.K. marketed under trademark designation of JSM7 35FC) at 20,000 magnifications.

A total of 7,600 hollow fibers obtained as described above were contained in a tubular body of polycarbonate resin, with the opposite ends of the bundle of hollow fibers fixed by filling gaps with a high molecular potting agent to complete an artificial kidney having a film surface area of 0.8 m$^2$. The artificial kidney was sterilized with ethylene oxide gas and then tested for permeability for varying solute and stopping ratio. The test was performed on a varying index substance indicated below as dissolved in physiological saline water in an indicated concentration.

| Index substance | Concentration of solution (mg/dl) | Method of determination |
|---|---|---|
| Creatinine | 60 | Jaffe method |
| Vitamine B$_{12}$ | 60 | Direct absorption method (360 nm) |
| Inulin | 60 | Thiobarbiturate method |
| Bovine albumin | 300* | BCG method |

*Since permeability for this substance was low, the concentration was hightened to improve accuracy of determination.

The artificial kidney was subjected to a circulation test at room temperature (23.5°±2° C.) at a flow speed of 200 ml/min under the condition of TMP (Note 1) 200 mmHg. For the determination of fraction molecular weight, 4 ml of the filtrate under normal condition (Note 2) was sampled at not less than two points (with intervals of 30 minutes), with the average of found values recorded. The determination of the amount of filtration was effected by gathering the filtrate under normal condition in a measuring cylinder and finding the scale reading. The filtrate was returned from time to time to the solution bath so as to prevent the solute concentration from rising.

(Note 1) $(Pi+Po)/2=200$ mmHg (Note 2) Sampling was continued in advance along the course of time until the values of measurement levelled of. The time thus found was regarded as marking the start of the normal condition.

The permeability and the stopping ratio of a varying solute are defined below. The results of the test are shown in Table 1.

Permeability $(T)=(Cf/Ci)\times 100$
Coefficient of permeability $(Tr)=Cf/Ci$
Stopping ratio $(R)=(Ci-Cf)\times 100/Ci$
Coefficient of stopping ratio $(Rj)=(Ci-Cf)/Ci$
Ci: Solute Concentration on the inlet side.
Cf: Solute Concentration on the filtrate side.

TABLE 1

| | (%) | | | | |
|---|---|---|---|---|---|
| | Creatinine (Mw 113) | Vitamin $B_{12}$ (Mw 1,350) | Inulin (Mw 5,200) | Cytochrome C (Mw 12,400) | Albumin (Ms 66,000) |
| Permeability | 99.9 | 93.7 | 40 | 30.2 | 0 |
| Stopping ratio | 0.1 | 6.3 | 60 | 69.8 | 100 |

Based on the relation between the coefficient of permeability (permeability/100) and the molecular weight, the molecular weight of the fraction showing the stopping ratio of 95% was found to be about 40,000 and the aberage ultrafiltration ratio to be 4.0 ml/mmHg.hr.m². The artificial kidney of this example showed high levels of permeability to inuline and Cytochrome c as compared with the conventional countertype and offered more readily permeation to substances having weight-average molecular weights of 5.000 to 20,000.

EXAMPLE 2

Hollow fibers were obtained by following the procedure of Example 1, except that 1,1,1-trichloroethane was used as the non-coagulating solution 3, an aqueous solution containing 46 g of sodium hydroxide per liter was used as the coagulation solution, a spinning dope (having a cellulose concentration of 7.7% and a viscosity of 900 poises at 20° C.) was discharged at a rate of 6.47 ml/min, and isopropyl myristate (specific gravity 0.854) was introduced and discharged at a rate of 2.64 ml/min and allowed to be included in the extruded tubes of the spinning dope. In this case, the linear speed ratio was 2.85. The attributes of the hollow fibers obtained as described above are shown in Table 3.

EXAMPLE 3

An aqueous cuprammonium soultion was prepared by suspending 53 kg of basic copper sulfate in 231 kg of an aqueous 25% ammonia solution. It was mixed with 166 kg of an aqueous 10% sodium sulfite solution. In the resultant mixed solution, 68.7 kg of linter pulp (absolutely dry) and 176 kg of concentration-adjusting RO water were stirred and subsequently 108.5 kg of an aqueous 10% sodium hydroxide solution was added thereto, to produce a cuprammonium cellulose spinning dope. The cellulose concentration of this spinning dope was 8.5% and the viscosity thereof was 1,200 poises (at 20° C.). In the apparatus described in Example 1, this spinning dope of treated by the procedure of Example 1 to afford hollow fibers.

In this case, the linear speed ratio was 1.79. The attributes of the hollow fibers thus produced are shown in Table 3.

Then the hollow fibers were tested for variation of the wall thickness in the cross section perpendicular to the axial line of the fibers. A sample hollow fiber 20 cm was cut from the hollow fiber taken up on the bobbin was washed to remove the internal solution (isopropyl myristate) and then left standing overnight at 22° C. and 60% of humidity. The hollow fiber, with the inside and outside solidified, which were subjected to the test using a projector (product of Nippon Kogaku K.K. marketed under trademark designation of "Nikon, PROFILE PROJECTOR V-12") (verified).

Figure 8:
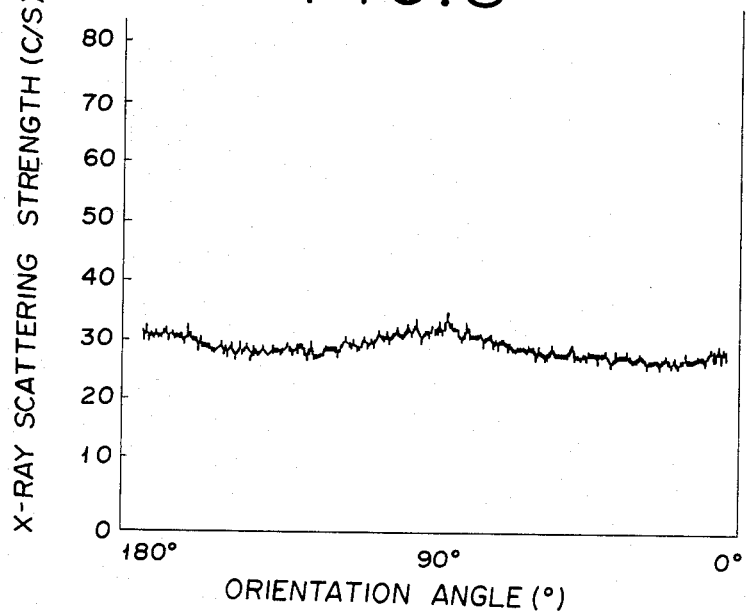
FIG. 8 is a graph showing an X-ray scattering strength curve of a hollow fiber of the present invention.
Figure 7:
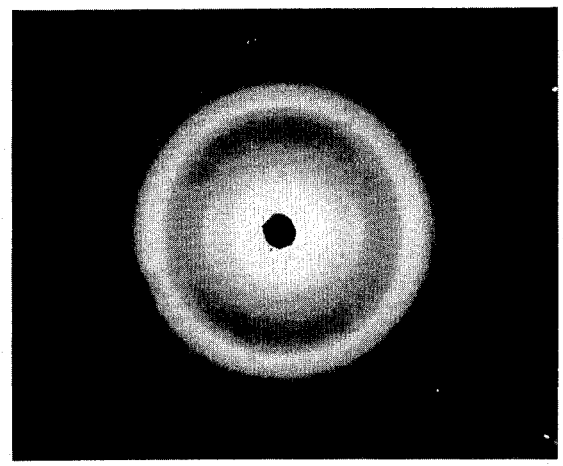
FIG. 7 is an X-ray diffraction photograph of a hollow fiber of the present invention.
Figure 9:
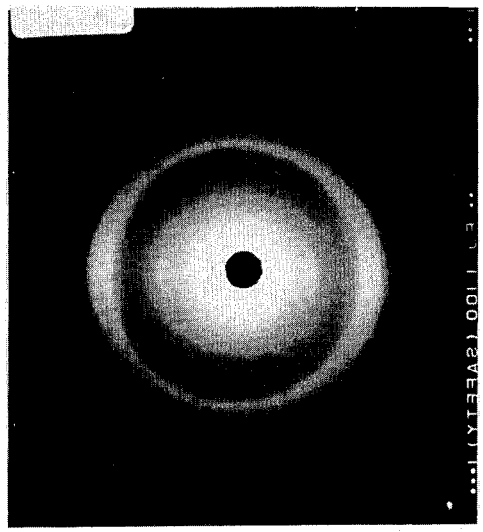
FIG. 9 is an X-ray diffraction photograph of a hollow fiber stretched by 30% prior to entry in a drier.

The hollow fiber of the present invention gave average wall thickness, $d=13$ μm, standard deviation, $\delta=1.56$, and ratio of variation, $Cv=0.12$, to the test. It also gave average external diameter, $x=230$ μm, standard deviation, $\delta=20.7$, and ratio of variation, $Cv=0.09$. The unstretched hollow fiber produced as described above (according with this invention) and the unstretched hollow fiber not yet introduced into the drier 20 and stretched by 30% were compared in terms of x-ray diffraction phtograph, X-ray scattering strength curve, and birefringence (retardation method). The respective hollow fibers were assembled to form dialyzers having a film surface area of 1 m² and tested for ultrafiltration ratio and permeability. The results are shown in Table 2. An X-ray diffraction photograph of the hollow fiber of the present invention is shown in FIG. 7 and an X-ray scattering strength curve in FIG. 8. An X-ray diffraction photograph of the hollow fiber stretched by 30% is shown in FIG. 9 and an X-ray scattering strength curve in FIG. 10.

The physical properties mentioned above were determined by the respective methods described below.
(Determination of X-ray diffraction and X-ray scattering strength)

A bundle of hollow fibers 20 mm in length and 2 mm in diameter was prepared as a specimen and phopographed by means of X-ray diffraction. This specimen was fixed on a rotary base and a scintillation counter was fixed on the bearing of 20.5 degrees (equivalent to $10\bar{1}$ reflection), the angle at which the scattering strength is highest, to take count of scattered X-ray along the arc of $10\bar{1}$ reflection over 180 degrees from the meridian through the equator to the meridian. The measuring instruments used and the conditions of the measurement were as shown below.

| | Chart record |
|---|---|
| X-ray device | Geiger flex spectrometer, Model 2028, made by Rikagaku Denki K.K. |
| Target | Cu |
| Kv-mA | 30 Kv-20 mA |
| Filter | Ni |
| Full Scale | $1 \times 10^3$ c/s |
| Time Const. | 2 sec |
| Scanning Speed | 80/min |
| Chart Speed | 10 mm/min |

| | -continued | |
|---|---|---|
| Detector | Scintillation Counter X-ray photography | |
| Voltage | 40 Kv | |
| Amperage | 20 mA | |
| Exposure time | One hour | |
| Camera length | 58 mm | |
| Monochrometer | None | | instruments used for the determination and the conditions of determination were as follows.

| Polarizing microscope | Olympus, POH |
|---|---|
| Light source | White light, 550 mμ |
| Compensator | No. 20008, C × $10^{-4}$ = 0.852 |

TABLE 2

| | Double refractive index | Ultra-filtration ratio (ml/mmHg · hr · m²) | Urea (ml/min) | Creatinine (ml/min) | Vitamin $B_{12}$ (ml/min) | Permeability for Inuline (%) | Permeability for Albumin (%) |
|---|---|---|---|---|---|---|---|
| Hollow fiber of this invention (10% shrinkage) | 0.003 | 4.6 | 172 | 143 | 45 | 40 | 0 |
| Hollow fiber stretched by 30% | 0.008 | 3.2 | 92 | 82 | 24 | 32 | 0 |

(determination of double refractive index)

This property was determined by the retardation method.

A given specimen of hollow fiber was placed on a slide glass, impregnated with a soaking solution (refractive index 1.530), covered with a cover glass, and set in place on a rotary stage in a polarizing microscope. Under a white light source with a compensator removed, the specimen was rotated on the stage under a cross Nicol and fixed at the position of the highest brightness (reached by 45° rotation in either direction from the darkest positon). At this point, the compensator was inserted and rotated in the vertical direction with the position of 30° as the center to determine the angle ($\theta_1$ and $\theta_2$) at which black fringes appeared and the angle of inclination of the compensator (i). The double refractive index of the hollow fiber was calculated from the following formula.

$$\text{Double refractive index, } \Delta n = \frac{1}{d} f(i) \cdot C$$

(wherin d stands for thickness of the specimen, f(i) for phase difference, and C for optical coefficient). The results described above indicate that since the hollow fibers of this invention undergo about 10% of self-shrinkage when dried, they show higher permeability than the hollow fibers stretched by 30% while in a dry state.

The X-ray diffraction photograph and the X-ray scattering strength curve obtained of the hollow fibers stretched by 30% bore close resemblance to those attached to the argument (dated Sept. 6, 1977) submitted during the course of the Patent Office examination of Japanese Patent Publication SHO 50(1975)-40,168. A dialyzer of a film surface area of 1.0 m² was formed by bundling 6,800 hollow fibers 235 mm in length was tested for overall boundary film thickness under the conditions of dialysis of $Q_B$=200 ml/min and $Q_D$=500 ml/min (with the wet packing ratio of the dialyzer at 0.382 and the urea diffusion coefficient at $1.81 \times 10^{-5}$ cm/sec). Thus, the overall boundary film thickness was found to be about 32 μm.

EXAMPLE 4

Hollow fibers were produced by following the procedure of Example 1 using a spinning dope having a cellulose concentration of 6.0% and a viscosity of 600 poises. The attributes of the hollow fibers so produced are shown in Table 3.

TABLE 3

| | Example 1 | Example 2 | Example 3 | Example 4 | Commercially available hollow fibers (product of Asahi Medical, AM-10(H) | Argument relating to Japanese Patent Publication SHO 50(1975)-40,168 |
|---|---|---|---|---|---|---|
| External diameter (μm) | 225 | 250 | 230 | 240 | 200 | — |
| Wall thickness (μm) | 12.5 | 13.5 | 13 | 13.5 | 15 | 20.1 |
| skin layer | No | No | No | No | Yes (FIG. 5) | — |
| Void | No | No | No | No | Yes (FIG. 6) | — |
| Average pore diameter (Å) | 33 | 38 | 32 | 40 | 22 | — |
| Porosity (%) | 18 | 19 | 16 | 21 | — | — |
| Tensile strength (dry), kg/mm² | 16 | 15 | 19 | 14 | 13 | 1,308 g/dn |
| knot strength (dry), kg/mm² | 16 | 15 | 19 | 14 | 13 | — |
| Ultrafiltration ratio, ml/mmhg · hr · m² | 4.4 | 4.9 | 4.1 | 5.6 | 2.9 | — |
| Permeability | Good | Good | Good | Good | Good | — |

(Porosity and average pore diameter were calculated based on ultrafiltration ratio and solute permeability coefficient for urea.)

Figure 5:
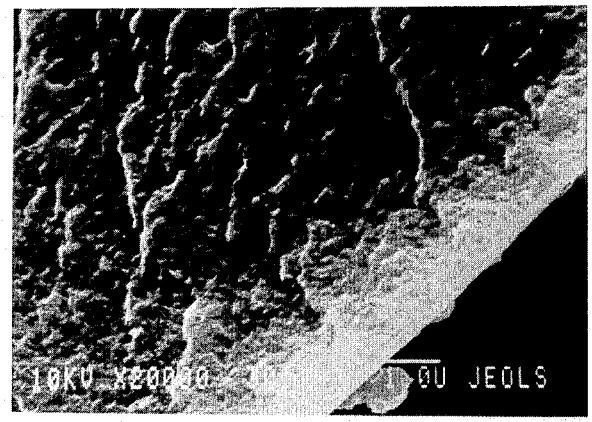
FIG. 5 is an electron microscopic photograph (20,000 magnifications) showing a longitudinally crossectional texture of a commercially available hollow fiber, AM-10(H)
Figure 6:
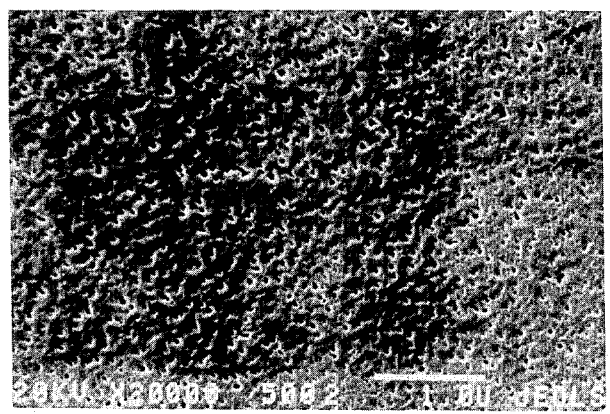
FIG. 6 is an electron microscopic photograph (20,000 magnifications) showing an inner surface texture of the commercially available hollow fiber, AM-10(H)

FIG. 5 referred to in Table 3 represents an electron microscopic photograph showing a longitudinal cross section of a hollow fiber used in a commercial product (AM10), revealing the presence of a skin layer on the outer surface. FIG. 6 referred to Table 3 represents an electron microscopic photograph showing an inner surface texture of the same hollow fiber, reverealing the presence of numerous voids therein. The photographs were taken through a microscope (product of Nippon Denshi Kogyo K.K. marketed under trademark designation of JSM7 35FC) at 20,000 magnifications.

The hollow fibers of the present invention for dialysis are obtained by extruding, coagulating, and regenerating a cuprammonium cellulose spinning dope having a cellulose concentration of 6.0 to 8.7% and a viscosity of 500 to 1,300 poises (at 20° C.) and is possessed of a film structure having a porosity of 15 to 25%, a pore diameter of 25 to 40 Å, and an ultrailtration ratio of 3.0 to 5.5 ml/mmHg.hr.m$^2$. The hollow fibers of this film structure enjoy the advantage that the average amount of filtration is large and the molecular weight of the maximum fraction of 95% is large. Further since the molecular weight of the maximum fraction having a stopping ratio of 95% is about 40,000, the hollow fibers are permeable to such substrances as cytochrome C which possess relatively large molecular weights. The hollow fibers posseesing such outstanding properties for the dialysis film in an artificial kidney are obtained from the spinning dope possessing a cellulose concentration of only 6.0 to 8.7% and a viscosity of only 500 to 1,300 poises. Use of the spinning dope of this quality gives a solution to the various problems such as insufficient agitation and insufficient dissolution of raw materials during the preparation of the spinning dope, difficulty of transportation of the spinning dope, and pulsation and breakage of the extruded tubes of the spinning dope. Moreover, in terms of mechanical strength, these hollow fibers are favorably comparable with the conventional countertypes. When the hollow fibers of the present invention are manufactured by the floating spinning method, the formation of a skin layer in the outer surface and the formation of voids in the inner surface are substantially avoided. Thus, the hollow fibers can be expected to possess uniform pores throughout the entire wall thickness and enjoy improvement in ultrafiltration ratio and ability of dialysis.

The wall thickness of the hollow fibers in the cross section perpendicular to the axial line of the fibers is varied in the axial direction of fibers, the blood or the liquid for dialysis generates turbulence at positions of variation and the occurrence of boundary film is repressed to below 40 μm during the course of dialysis, with the result that fresh blood or liquid is brought into contact with the film surface at all times. Thus, the hollow fibers enjoy improvement in the ability of dialysis. The hollow fibers also provide notably improved separation of substances of intermediate molecular weights and, therefore, permit a notable increase of blue adrenaline in the blood plasma of a patient under treatment of dialysis. Thus, the use of these hollow fibers brings about an improvement regarding the symptoms (hypotension, shock, and itchiness) which have heretofore hindered the dialysis.

In accordance with the method of this invention for the manufacture of hollow fibers, since the spinning dope is not exposed to the ambient air, the ammonia in the spinning dope is not allowed to pass into the ambient air and the possibility of the hollow fibers forming a skin layer on the surface is eliminated. Further since the coagulation, regeneration, and washing with water of the extruded tubes of the spinning dope are carried out while the tubes are carried on the conveyor device. Thus, the hollow fibers are given a necessary aftertreatment and enabled to undergo self-shrinkage without being exposed to any tension. The hollow fibers in process on the conveyor device are directly passed through the glycerol bath plasticization. Even after the subsequent step of drying, therefore, the hollow fibers still possess a water content of about 10% and ovbiate the necessity for a treatment of plasticization after the step of drying. The drying of the hollow fibers is effected in such a manner as to enable them at least to dry with shrinkage. To be more specific, in a drier having a plurality of rollers of gradually decreasing diameter are disposed in a zigzagging pattern in the direction of the travel of the hollow fibers, this drying is effected by advancing the hollow fibers as passed around the rollers and applying heat to the hollow fibers in motion therein. Thus, any tension arising from the self-shrinkage is absorbed and otherwise possible exertion of tension on the hollow fibers in the axial direction thereof is precluded. Since the linear speed ratio of the spinning dope and the non-coagulating solution caused to enter and fill up the interiors of the extruded tubes of the spinning dope falls in the range of 1.2 to 3.0, the inner surface of the hollow fibers enjoys stable attributes and freedom from the generation of voids. Owing to the series of steps described above, there are eventually produced unstretched hollow fibers for dialysis possessing a film structure which has a porosity of 15 to 25%, a pore diameter of 25 to 40 Å, and an ultrafiltration ratio of 3.0 to 5.5 ml/mmHg.hr.m$^2$. The hollow fibers so obtained manifest outstanding effects as described above.

What is claimed is:

1. A method for the manufacture of unstretched hollow fibers of cuprammonium cellulose for dialysis possessing a film structure having a porosity of 15 to 25%, a pore diameter of 25 to 40 Å, and an ultrafiltration ratio of 3.0 to 5.5 ml/mmHg.hr.m$^2$., which method is characterized by the steps of directly discharging a cuprammonium cellulose spinning dope possessing a cellulose concentration of 6.0 to 8.7% and a viscosity of 600 to 1200 poises (at 20° C.) through annular spinning orifices into a bath filled with a non-coagulating solution in the upper layer and said non-coagulating solution in the lower layer and, at the same time, allowing said non-coagulating solution to enter and fill up the interiors of the discharged tubes of the spinning dope, then passing said tubes of the spinning dope through said coagulating solution thereby allowing said tubes to coagulate, allowing the resultant wet hollow fibers to be shaken down onto a conveyor device without being stretched, subjecting said hollow fibers to coagulation, regeneration, and washing with water while in motion as carried on said conveyor device, then subjecting the regenerated hollow fibers to plasticization, and further shrinking and drying the resultant hollow fibers.

2. A method according to claim 1, wherein the linear speed ratio of said spinning dope dischaged through said spinning orifices and said non-coagulating solution allowed to enter and fill up the interiors of said tubes of the spinning dope is 1.2 to 3.0.

3. Unstretched hollow fibers suitable for dialysis prepared by the process of claim 2.

4. A method according to claim 1, wherein said non-coagulating solution filling said lower layer is a halogenated hydrocarbon having a specific gravity of not less than 1.3.

5. Unstretched hollow fibers suitable for dialysis prepared by the process of claim 4.

6. A method according to claim 1, wherein said non-coagulating solution of said halogenated hydrocarbon possesses solubility of not more than 0.15 g/100 ml for water.

7. Unstretched hollow fibers suitable for dialysis prepared by the process of claim 6.

8. A method according to claim 1, wherein said spinning dope has a cellulose concentration in the range of 7.0 to 8.5 and a viscosity in the range of 800 to 1200.

9. Unstretched hollow fibers suitable for dialysis prepared by the process of claim 8.

10. Unstretched hollow fibers suitable for dialysis prepared by the process of claim 1.

11. A method according to claim 1, wherein said drying of the resultant hollow fibers is carried out while said hollow fibers travel through a dryer having a plurality of rollers disposed in a zigzagging pattern such that the diameters of said hollow fibers gradually decrease in the direction of travel.

* * * * *